April 6, 1926.

C. N. MITCHELL

SHOCK ABSORBER

Original Filed May 17, 1923

1,579,727

INVENTOR
COURTNEY N. MITCHELL
BY Arthur E. Merkel
ATTORNEY

Patented Apr. 6, 1926.

1,579,727

UNITED STATES PATENT OFFICE.

COURTNEY N. MITCHELL, OF CLEVELAND, OHIO, ASSIGNOR OF ONE-HALF TO ERNEST H. GEYER, OF CLEVELAND, OHIO.

SHOCK ABSORBER.

Application filed May 17, 1923, Serial No. 639,536. Renewed May 28, 1924.

*To all whom it may concern:*

Be it known that I, COURTNEY N. MITCHELL, a citizen of the United States, resident of Cleveland, county of Cuyahoga, and State of Ohio, have invented new and useful Improvements in Shock Absorbers, of which the following is a specification, the principle of the invention being herein explained, and the best mode in which I have contemplated applying that principle, so as to distinguish it from other inventions.

My invention relates to shock-absorbers and particularly to shock-absorbers adapted for use in automotive vehicles of that type in which the absorber is fixedly mounted upon the frame of the vehicle and connected with the wheel axle by means of a flexible strap which is adapted to actuate the device to apply the braking action when the frame moves away from the axle, and also in which means are provided for taking up the slack in the strap when the frame and axle approach each other.

The object of the invention is to provide a shock-absorber of the above described character which is simple and hence economical in construction and which will efficiently perform its function.

Said invention consists of means hereinafter fully described and particularly set forth in the claims.

Figures 1, 2:
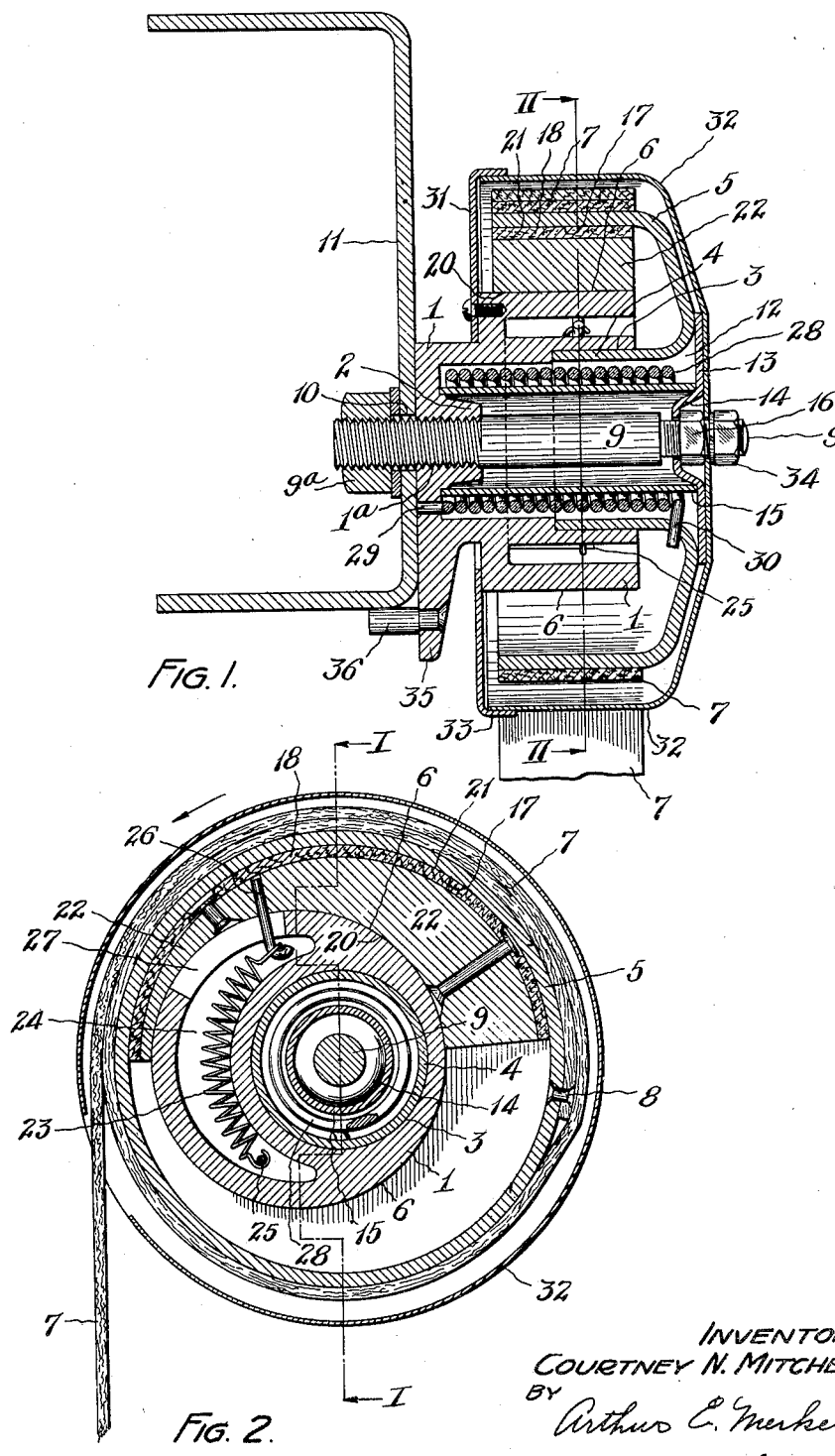
Fig. 1 represents an axial section of the absorber and a transverse section of the frame of an automobile upon which said absorber is mounted.
Fig. 2 represents a section taken upon the plane indicated by line II—II, Fig. 1, and viewed in the direction indicated by the arrows.

The illustrated embodiment of my invention includes a hollow hub 1 open at the outer end, the other end being formed with an inwardly projecting boss 2, Fig. 1. The outer end portion of said hub is formed with an interior cylindrical bearing surface 3 coaxial with the hub, and in which is seated an inwardly projecting hollow journal member 4 formed upon a drum 5.

The hub 1 is furthermore formed with an outer cylindrical braking surface 6 whose axis is parallel with but eccentric relatively to the axis of the drum and hub, as shown in Fig. 2. Wound upon the exterior of said drum is a strap 7 whose inner end is secured to the drum, as by means of rivets 8, and whose other end is secured to the vehicle axle (not shown) in any suitable manner, and as will be readily understood.

The inner portion of the hub is provided with a central and threaded hole $1^a$ which receives the threaded inner end of a stud bolt 9, which passes through a plain hole 10 formed in the web 11 of the body frame, and is provided with a suitable nut $9^a$ by means of which the bolt and hub may be rigidly secured to the said frame, as shown.

The outer opening 12 formed by the journal member 4 is closed by a washer 13 formed with an inwardly projecting boss 14. The bosses 2 and 14 are of similar external diameter and form a seat for a tubular sleeve 15 the outer end of which the washer 13 engages. The length of said sleeve is such that the washer may be tightly secured in place against the sleeve without binding against the end of the drum, and hence will not interfere with the rotation of the latter.

The outer end portion of the stud 9 is threaded and the washer secured in place by means of a nut 16 engaging such threaded portion, as shown in Fig. 1.

The drum 5 is furthermore formed with an interior cylindrical braking surface 17 coaxial with the drum. The two braking surfaces 6 and 17 will hence bear a converging and diverging relation to each other.

Interposed between the two braking surfaces 6 and 17 and having corresponding braking surfaces 20 and 21 respectively, is a movable wedge-shaped friction member 22, surface 20 being formed by a strip of brake-lining 18 riveted to said member. This member is held in contact with said surfaces 6 and 17 by a coiled spring 23, Fig. 2, located in an interior cavity 24 formed in the hub, one end of which is secured to the latter, as at 25, and the other end of which is secured to a pin 26 projecting through a circumferential slot 27 and formed in said member 22.

Mounted upon the exterior of sleeve 15, is a coiled spring 28 one end of which is secured to the hub, as at 29, and the other end to the drum, as at 30, Fig. 1.

The parts are so arranged that when the hub is rotated by a pull on the strap, whereby the latter is unwound, the spring 28 will be wound up, so that when the strap is released the drum will be rotated in the opposite direction.

A suitable sheet metal housing encases the drum and consists of a flanged disk 31 mounted on the hub, and a cup-shaped member 32 whose inner end interiorly engages the flange 33 of disk 31 and whose outer end is secured in place by a nut 34 engaging the outer threaded end of stud 9, which clamps it against nut 16, Fig. 1.

When the drum 5 is rotated by the strap 7, that is in the direction of convergence of the braking surfaces, as indicated by the arrow in Fig. 2, the friction member 22 will engage the braking surfaces of the drum and hub and retard the recession of the frame and axle from each other, as will be readily understood.

Since the spring 23 holds the member 22 in engagement with the braking surfaces of the drum and hub when the parts are at rest, the beginning of such braking action is coincident with the beginning of the rotation of the drum.

When the axle and frame approach, the strap is rewound by the spring 28, and the friction member 22 being inoperative during such movement, as will be understood by those skilled in the art.

The hub is also preferably provided with a lug 35 carrying a pin 36 which engages the bottom of the frame, and insures the device against rotative displacement on its support, as will be readily seen

What I claim is:

1. In a shock-absorber, the combination of a hub adapted to be fixed to a suitable support and having an exterior cylindrical surface; a rotatable drum surrounding said hub having an axis parallel with but eccentric relatively to the hub axis, and an interior cylindrical braking surface whose axis coincides with the drum-axis, whereby said two braking surfaces converge; a strap secured to and adapted to rotate said drum in the direction of convergence of said surfaces; a spring adapted to rotate the drum in the opposite direction; and means interposed between said surfaces for wedging same when the drum is actuated by said strap.

2. In a shock-absorber, the combination of a hub adapted to be fixed to a suitable support and having an exterior cylindrical braking surface; a rotatable drum surrounding said hub having an axis parallel with the hub-axis but eccentric relatively thereto, and an interior cylindrical braking surface whose axis coincides with the drum axis, whereby said two braking surfaces converge; a strap secured to and adapted to rotate said drum in the direction of such convergence; a spring adapted to rotate the drum in the opposite direction; means interposed between said two braking surfaces for wedging same when the drum is rotated by said strap; and separate means for holding said interposed means in contact with said surfaces.

3. In a shock-absorber, the combination of a hub adapted to be fixed to a suitable support and having an exterior cylindrical braking surface and an interior cylindrical bearing whose axis is parallel with but eccentric relatively to the hub-axis; a drum having a journal member mounted in said bearing and having an interior cylindrical braking surface concentric with said bearing, whereby said hub and drum braking surfaces converge; means for rotating said drum in the direction of such convergence; a spring adapted to rotate said drum in the opposite direction; and a wedge member having exterior surfaces conforming to the curvature of said braking surfaces and located therebetween.

4. In a shock-absorber, the combination of a hub adapted to be fixed to a suitable support and having an exterior cylindrical braking surface and an interior cylindrical bearing whose axis is parallel with but eccentric relatively to the hub-axis; a drum having a journal member mounted in said bearing and having an interior cylindrical braking surface concentric with said bearing, whereby said hub and drum braking surfaces converge; means for rotating said drum in the direction of such convergence; a spring adapted to rotate said drum in the opposite direction; and a wedge member having exterior surfaces conforming to the curvature of said braking surfaces and located therebetween; and separate means for holding said wedge member in contact with said braking surfaces.

5. In a shock-absorber, the combination of a hollow hub having an exterior cylindrical braking surface and an interior cylindrical bearing whose axis is parallel with but eccentric relatively to the hub-axis; a drum having a hollow exteriorly open journal member mounted in said bearing and having an interior cylindrical braking surface concentric with said bearing, whereby said hub and drum braking surfaces converge; a strap secured to the exterior of said drum and adapted to rotate same in the direction of such convergence; a washer closing the outer end of said journal member and provided with an interiorly projecting boss; said hub provided with a boss projecting into same from the opposite end thereof; a tubular sleeve having its ends seated upon said bosses respectively; a coiled spring surrounding said sleeve having one end secured to said hub and the other to said drum; said spring arranged to oppose such rotation; a wedge member interposed between said converging surfaces; and a spring adapted to hold said wedge in contact with the latter.

6. In a device of the character described, the combination of a hub adapted to be fixed to a suitable support and having a cylindrical surface, a rotatable drum surrounding a part of said hub having an axis parallel with but eccentric relatively to the hub axis and cylindrical surface whose axis coincides with the drum axis whereby said cylindrical surface of said hub and cylindrical surface of said drum converge relatively to each other, means of rotating said drum in the direction of convergence of said cylindrical surfaces, a resilient member for rotating said drum in the opposite direction and means interposed between said surfaces for wedging same when drum is turned in direction of convergence of said surfaces.

7. In a device of the character described, the combination of a hub adapted to be fixed to a suitable support and having a cylindrical surface, a rotatable drum surrounding a part of said hub having an axis parallel with but eccentric relatively to the hub axis and cylindrical surface whose axis coincides with the drum axis whereby said cylindrical surface of said hub and cylindrical surface of said drum converge relatively to each other, means of rotating said drum in the direction of convergence of said cylindrical surfaces, a coiled spring for rotating said drum in the opposite direction and means interposed between said surfaces for wedging same when drum is turned in direction of convergence of said surfaces.

8. In an article of the character described, the combination of a braking element having a convex outer contact area and a concave inner contact area, a member having a concave bearing surface positioned adjacent to and adapted to contact with, the convex contact area of said braking element, a member having a convex bearing surface positioned adjacent to and adapted to contact with the concave contact area of said braking element, and means permitting relative motion between said braking element and either of said last-named members to progressively increase or decrease the degree of contact of said adjacent surfaces according to the direction of such motion.

9. In an article of the character described, the combination of a movable braking element having a convex outer contact area and a concave inner contact area, a member having a concave bearing surface positioned adjacent to, and adapted to contact with, the convex contact area of said braking element, a member having a convex bearing surface positioned adjacent to and adapted to contact with the concave contact area of said braking element, and means permitting relative motion between said last-named members to progressively increase or decrease the degree of contact of said adjacent surfaces according to the direction of such motion.

10. In an article of the character described, the combination of a movable braking element having a convex outer contact area and a concave inner contact area, a member having a concave bearing surface positioned adjacent to, and adapted to contact with, the convex contact area of said braking element, a member having a convex bearing surface positioned adjacent to and adapted to contact with the concave area of said braking element, said last-named members being positioned eccentrically with respect to each other, and means permitting relative motion between said last-named members to progressively increase or decrease the degree of contact of said adjacent surfaces according to the direction of such motion.

11. In an article of the character described, the combination of a braking element having a convex outer contact area provided with friction material and a concave inner contact area, a member having a concave cylindrical bearing surface positioned adjacent to, and adapted to contact with, the convex contact area of said braking element, a member having a convex cylindrical bearing surface positioned adjacent to, and adapted to contact with, the concave area of said braking element, said cylindrical members being positioned eccentrically with respect to each other, and means permitting relative motion between said braking element and either of said cylindrical members to progressively increase or decrease the degree of contact of said adjacent surfaces according to the direction of such motion.

12. In an article of the character described, the combination of a solid non-resilient brake shoe having a convex outer contact area and a concave inner contact area, a non-resilient member having a concave bearing surface positioned adjacent to, and adapted to contact with, the convex contact area of said brake shoe, a non-resilient member having a convex bearing surface positioned adjacent to, and adapted to contact with, the concave area of said brake shoe, and means permitting relative motion between said last-named members to progressively increase or decrease the degree of contact of said adjacent surfaces according to the direction of such motion.

13. In an article of the character described, the combination of a support, a solid non-resilient brake shoe movably associated therewith having a convex outer contact area and a concave inner contact area, a non-resilient member having a concave bearing surface positioned adjacent to, and adapted to contact with, the convex contact area of said brake shoe, a non-resilient member having a convex bearing surface positioned adjacent to, and adapted to contact with, the concave area of said brake shoe, and means permitting relative motion between said last-named members to progressively increase or decrease the degree of contact of said adjacent surfaces according to the direction of such motion.

14. In an article of the character described, the combination of a support, a solid non-resilient brake shoe movably associated therewith having a convex outer contact area and a concave inner contact area, a non-resilient member having a concave bearing surface positioned adjacent to, and adapted to contact with, the convex contact area of said brake shoe, a non-resilient member having a convex bearing surface positioned adjacent to, and adapted to contact with, the concave area of said brake shoe, means permitting relative motion between said last-named members to progressively increase or decrease the degree of contact of said adjacent surfaces according to the direction of such motion, and resilient means adapted to hold said brake shoe normally in contact with one of the adjacent elements.

15. In a shock absorber, the combination of a hub having an exterior cylindrical braking surface, a rotatable drum surrounding said hub, but positioned eccentrically with respect thereto having an axis parallel with the hub axis and having an interior cylindrical braking surface whose axis coincides with the drum axis, whereby said two braking surfaces converge, a strap secured to and adapted to rotate said drum in the direction of convergence, and means interposed between said two braking surfaces for wedging same when the drum is rotated by said strap.

16. In a shock absorber, the combination of a hub having an exterior cylindrical braking surface, a rotatable drum surrounding said hub, but position eccentrically with respect thereto having an axis parallel with the hub axis and having an interior cylindrical braking surface whose axis coincides with the drum axis, whereby said two braking surfaces converge, a strap secured to and adapted to rotate said drum in the direction of convergence, means interposed between said two braking surfaces for wedging same when the drum is rotated by said strap, and means for tensioning said drum against the pull of said strap.

17. In a shock absorber, the combination of a hub having an exterior cylindrical braking surface, a rotatable drum surrounding said hub, but positioned eccentrically with respect thereto having an axis parallel with the hub axis and having an interior cylindrical braking surface whose axis coincides with the drum axis, whereby said two braking surfaces converge, a strap secured to and adapted to rotate said drum in the direction of convergence, means interposed between said two braking surfaces for wedging same when the drum is rotated by said strap, and separate means for holding said interposed means in contact with said surfaces at all times.

18. In a shock absorber, the combination of a hub having an exterior cylindrical braking surface, a rotatable drum surrounding said hub, but positioned eccentrically with respect thereto having an axis parallel with the hub axis and having an interior cylindrical braking surface whose axis coincides with the drum axis, whereby said two braking surfaces converge, a strap secured to and adapted to rotate said drum in the direction of convergence, means interposed between said two braking surfaces for wedging same when the drum is rotated by said strap, separate means for holding said interposed means in contact with said surfaces at all times, and means for tensioning said drum against the pull of said strap.

19. In combination with a frame of a vehicle and a part of the vehicle movable relatively thereto, means for snubbing their relative movement comprising a fixed member, a member rotatable with the said vehicle part, and a wedge shaped element frictionally engaging said fixed and rotatable members.

20. A vehicle snubber comprising a member carried by the vehicle frame, a member rotatably responsive at all times with movements of the vehicle axle, and a wedge shaped member directly engaging said members for offering resistance to their relative movement.

Signed by me this 10th day of May, 1923.

COURTNEY N. MITCHELL.